(12) United States Patent
Terry

(10) Patent No.: US 11,378,376 B2
(45) Date of Patent: Jul. 5, 2022

(54) SYSTEM AND METHOD FOR USING A DIGITAL MEASURING DEVICE TO INSTALL A STRUCTURE

(71) Applicant: Kevin P. Terry, Miami, FL (US)

(72) Inventor: Kevin P. Terry, Miami, FL (US)

( * ) Notice: Subject to any disclaimer, the term of this patent is extended or adjusted under 35 U.S.C. 154(b) by 423 days.

(21) Appl. No.: 16/678,112

(22) Filed: Nov. 8, 2019

(65) Prior Publication Data

US 2021/0140750 A1 May 13, 2021

(51) Int. Cl.

| | |
|---|---|
| *G01B 3/10* | (2020.01) |
| *G01B 3/1084* | (2020.01) |
| *G01B 3/00* | (2006.01) |
| *G01B 3/1056* | (2020.01) |
| *H04W 88/02* | (2009.01) |
| *G06F 3/0482* | (2013.01) |
| *G01B 3/1094* | (2020.01) |

(52) U.S. Cl.
CPC ............ *G01B 3/1084* (2013.01); *G01B 3/002* (2013.01); *G01B 3/1056* (2013.01); *G01B 3/1094* (2020.01); *G06F 3/0482* (2013.01); *H04W 88/02* (2013.01)

(58) Field of Classification Search
CPC .................................................... G01B 3/1084
USPC .................................................... 33/762, 763
See application file for complete search history.

(56) References Cited

U.S. PATENT DOCUMENTS

| 4,242,574 A * | 12/1980 | Grant ................... G01B 3/1061 33/763 |
| 4,611,402 A * | 9/1986 | Yamamoto ........... G01B 3/1061 33/762 |
| 4,747,215 A * | 5/1988 | Waikas .................. G01B 7/026 33/763 |
| 5,060,394 A | 10/1991 | Lincoln et al. |
| 5,379,524 A * | 1/1995 | Dawson .................... B25F 1/00 33/760 |
| 5,433,014 A * | 7/1995 | Falk ........................ G01D 5/347 455/67.11 |
| 6,868,620 B2 * | 3/2005 | Sanoner ................... G01B 3/11 33/763 |
| 7,146,743 B2 * | 12/2006 | Oura ....................... G01D 5/363 33/555.4 |

(Continued)

*Primary Examiner* — George B Bennett
(74) *Attorney, Agent, or Firm* — GrayRobinson, P.A.; Michael J. Colitz, III

(57) ABSTRACT

Disclosed is a system and method for using a digital measuring device to install a structure. For example, the system can be used to install hurricane shutters over a window or door of a dwelling. Alternatively, the system can be used to install decorative shutters, shelving, or window treatments. Other example will be readily apparent to those skilled in the art. The present system is beneficial in any situation where taking accurate measurements is critical to the proper installation of a structure. The system employs a digital measuring device that wirelessly communicates with a mobile computing device. In one embodiment, the measuring device is a tape measure and the mobile computing device is a phone or table computer. The mobile computing device is preferably used to demonstrate to the user what measurements need to be taken. After the user takes the required measurements, the accuracy and sufficiency of the measurements are thereafter confirmed via the mobile computing device.

11 Claims, 13 Drawing Sheets

(56) References Cited

U.S. PATENT DOCUMENTS

| | | | |
|---|---|---|---|
| 7,363,723 B1* | 4/2008 | Peterson | G01B 3/1084 |
| | | | 33/760 |
| 9,310,176 B2* | 4/2016 | Han | G01B 3/1084 |
| 9,774,986 B2* | 9/2017 | Hoge | H04W 4/80 |
| 2009/0277031 A1* | 11/2009 | Stocking | E04G 21/1841 |
| | | | 33/562 |
| 2011/0131008 A1* | 6/2011 | Swanson | G01B 5/008 |
| | | | 702/152 |
| 2014/0123507 A1* | 5/2014 | Gupta | G01B 11/002 |
| | | | 33/1 M |
| 2014/0250708 A1* | 9/2014 | Bauer | G01B 3/1061 |
| | | | 33/760 |
| 2019/0063921 A1* | 2/2019 | George | G01C 3/06 |
| 2020/0080827 A1* | 3/2020 | Eun | G01B 3/1069 |
| 2021/0140750 A1* | 5/2021 | Terry | G01B 3/1056 |
| 2021/0278190 A1* | 9/2021 | Ney | G01B 3/1003 |

* cited by examiner

OUTSWING CASEMENT

INSWING CASEMENT/TILT & TURN

SIDE SLIDING

LOUVERS PROTRUDING FROM OPENING

LOUVERS NOT PROTRUDING FROM OPENING

AWNING WINDOW

FIXED WINDOW

SINGLE HUNG

DOUBLE HUNG

CIRCLE OR ELLIPTICAL TOPLITE

PERMANENT OBSTRUCTION

TOP IS CLEAR

MOVABLE OBSTRUCTION

SYSTEM AND METHOD FOR USING A DIGITAL MEASURING DEVICE TO INSTALL A STRUCTURE

TECHNICAL FIELD

This disclosure relates to a digital measuring system and an associated method. More specifically, the disclosure relates to a system that uses a digital measuring device to install a structure upon an opening.

BACKGROUND OF THE INVENTION

Installing shutters upon a house can be a daunting task. The task usually involves a salesperson visiting the house and visually surveying the windows that are to be protected. Often times the salesperson must take measurements in order to determine what types of shutters are even available. In the case of hurricane shutters, for example, the windows must be observed and measured in order to determine if roll shutters, accordion shutters, or panels are available to the consumer. Once the customer is presented with the available options, they must choose the desired shutter type. Even then, additional measurements must be taken in order to create a build sheet. Build sheets provide the details necessary for ordering the shutters and ensure that the ordered shutters can be properly installed. In order to accomplish all this, often times a salesperson must make multiple trips to a customer in order to finalize a sale.

Thereafter, once a sale is finalized, and a build sheet prepared, the various components of the shutter must be ordered. In the case of hurricane shutters, this involves ordering the aluminum extrusions that are needed for manufacturing and installing the shutters. These extrusions are ordered in particular sizes based upon the measurements taken by the salesperson. If the salesperson forgets to take a particular measurement, the ordering process is delayed. Further delays are encountered in the event any of the measurements taken by the salesperson are incorrect or inaccurate.

Over the years, various efforts have been made to improve measuring techniques and ensure the accuracy of hand-made measurements. For example, U.S. Pat. No. 5,060,394 to Lincoln discloses a tape measure device with a display window for presenting a digital readout of the measurement being made. The measurements are carried out by an encoder that provide a combined absolute sale and relative sale.

Another example is provided by U.S. Pat. No. 9,774,986 to Hoge which discloses a Bluetooth-enabled tape measuring system. The system includes a tape measure with a retractable tape that stores each measurement taken and transmits it to an associated computing device. The system may direct the user to make certain measurements based upon a user-stated project.

Although each of the forgoing inventions achieves its own unique objective, all suffer from common drawbacks. None of the background art discloses a system for guiding a user through the measurements needed to install a structure, such as installing a shutter upon a window or door. The background art also lacks a digital measuring device that can be used in conjunction with such a system to confirm both the accuracy of sufficiency of the measurements taken by the user. The system and method of the present disclosure fulfill these and other needs present in the art.

SUMMARY OF THE INVENTION

This disclosure provides a system and method for measuring an opening, such as a door or window for the purpose of installing a structure such a shutter or covering.

The disclosed system has several important advantages. For example, the system guides the user in selecting various features of the opening so that the available structures can be ascertained.

A further possible advantage is the system includes a database of relevant measurements that must be made in order for the structure to be properly installed.

Still yet another possible advantage of the present system is to provide a digital measuring device that wirelessly communicates with a mobile computing device and wherein the mobile computing device is employed in verifying the accuracy and sufficiency of the measurements taken by the user.

Another advantage of the present system is to provide a system whereby the user is directed to take certain measurements in order to install a structure and wherein the measurements include whether the measurement is to be taken to the inside or the outside of the object.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to a system and method for using a digital measuring device to install a structure. The system can be used, for example, to measure a window or door for the purpose of installing hurricane shutters. Other applications include taking measurements for the installation of decorative shutters, shelving, window treatments, roofing, railings, screen rooms, awnings, pergolas, and the like. The present system is beneficial in any situation where taking accurate measurements is critical to the proper installation of a structure. The system employs a digital measuring device and a mobile computing device that wirelessly communicate with one another. The mobile computing device is employed by the user to build a digital representation of the opening over which the structure is to be installed. The mobile computing device is thereafter used to depicted to the user what measurements need to be taken. The user then takes the depicted measurements with the digital measuring device. The system is used to confirm the accuracy and sufficiency of the measurements taken. The various features of the present disclosure, and the manner in which they interrelate, are described in greater detail hereinafter.

System for Using Digital Measuring Device

Figure 1:
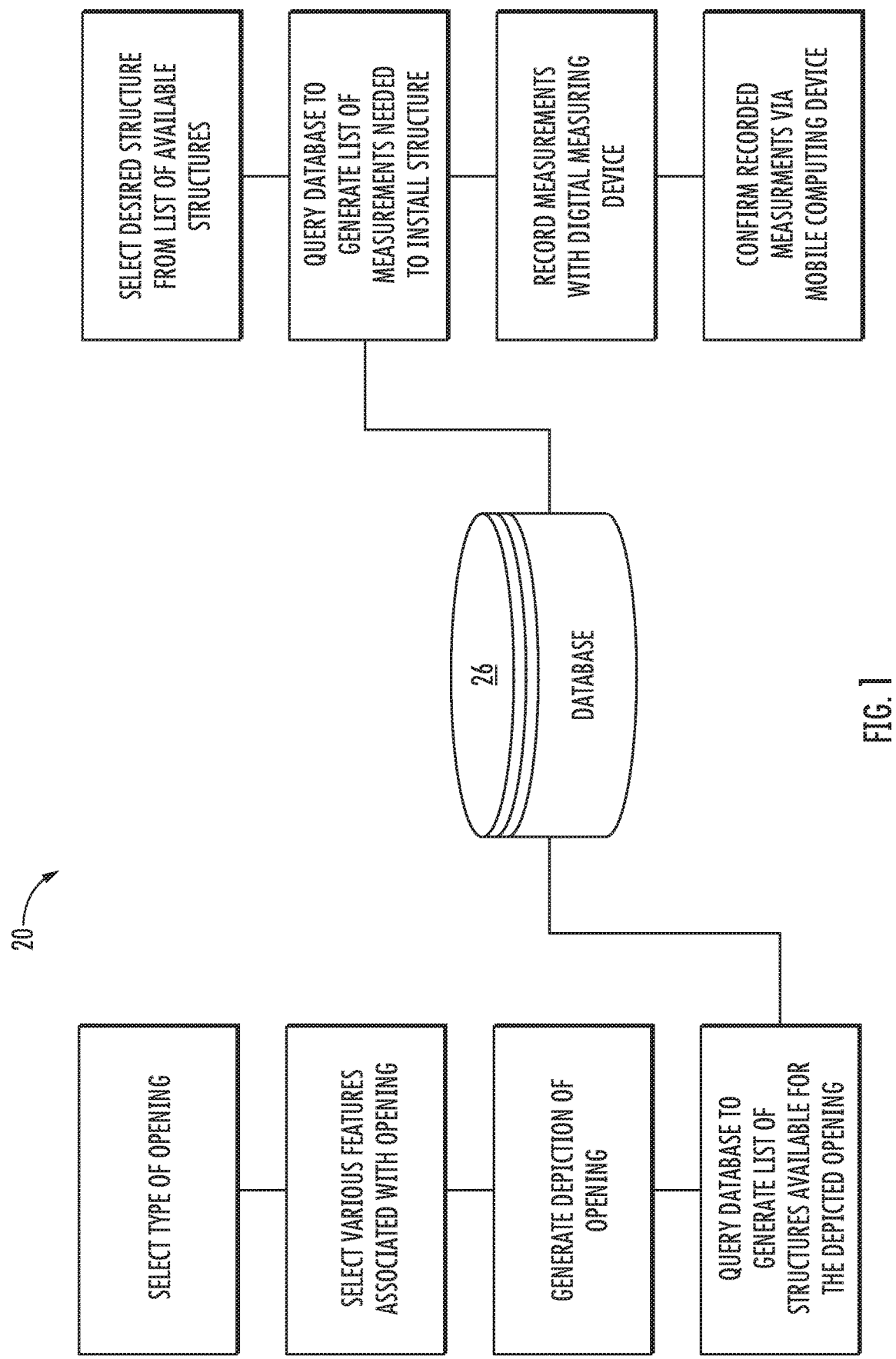
FIG. 1 is a flow chart illustrating some of the steps associated with the present method.
Figure 2:
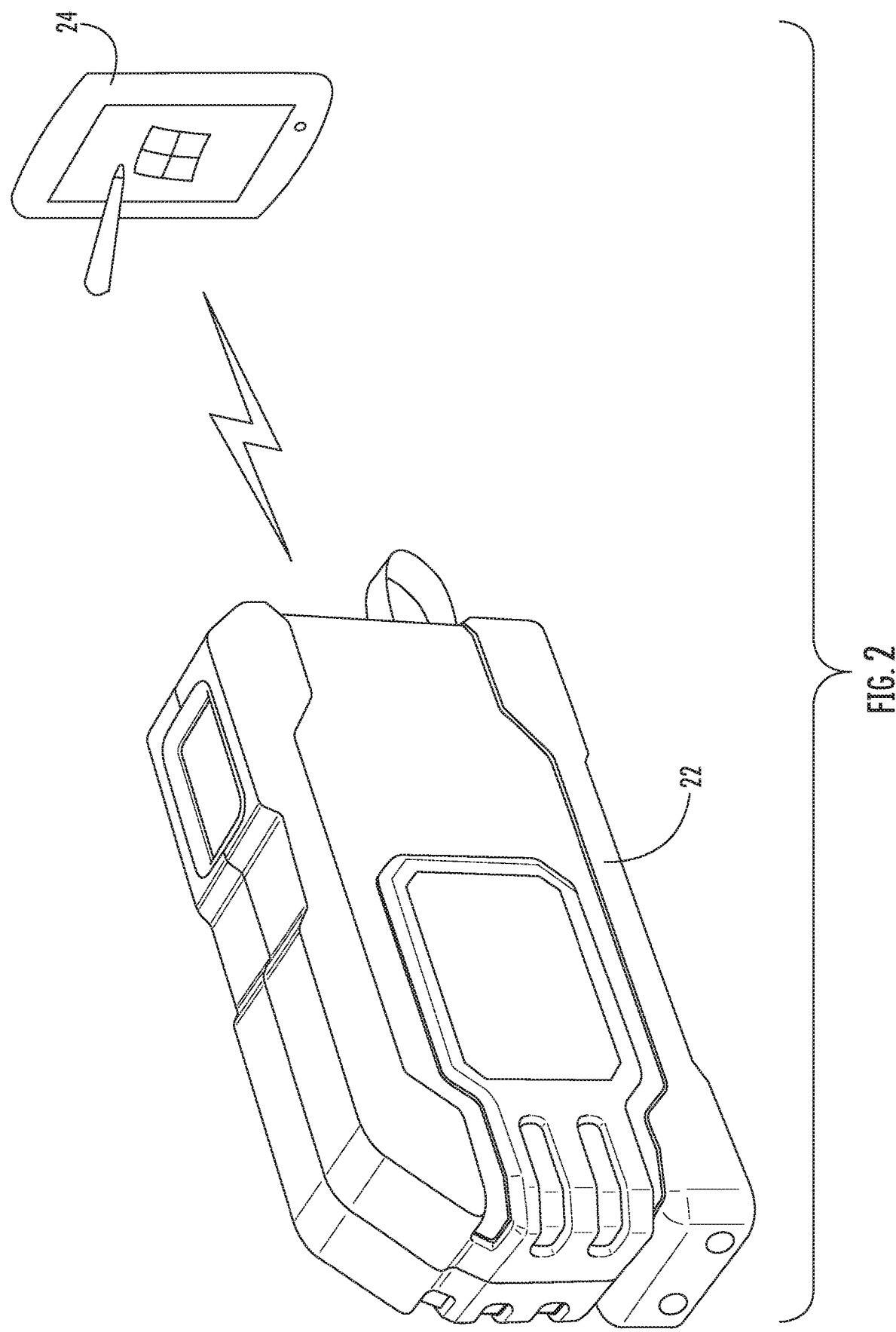
FIG. 2 is a perspective view of the digital measuring system of the present disclosure.
Figure 3:
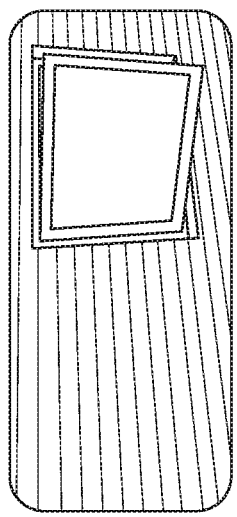
FIG. 3 is a graphic depiction of some window types that can be presented to the user.
Figure 3:
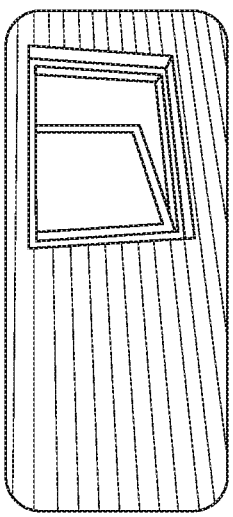
Figure 3:
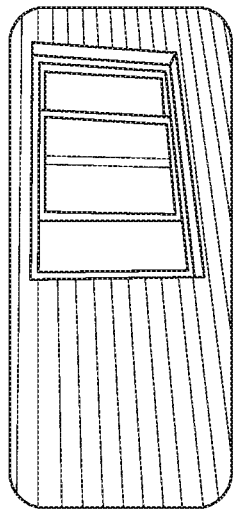
Figure 3:
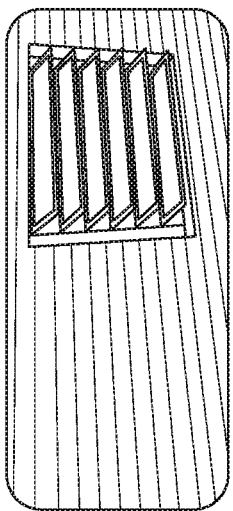
Figure 3:
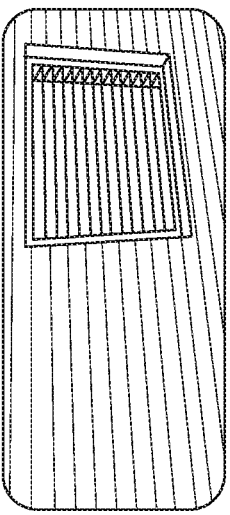
Figure 3:
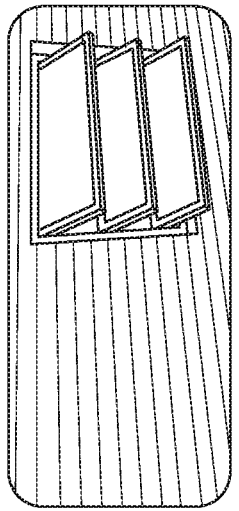
Figure 3:
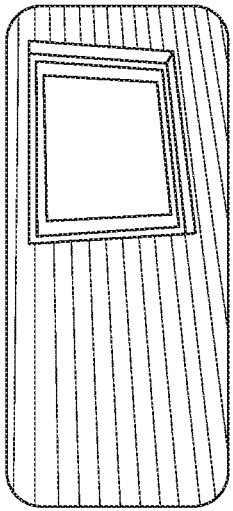
Figure 3:
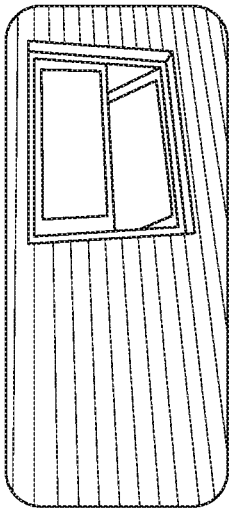
Figure 3:
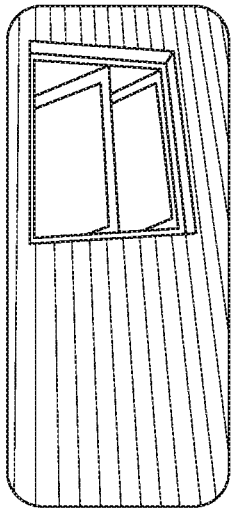
Figure 4:
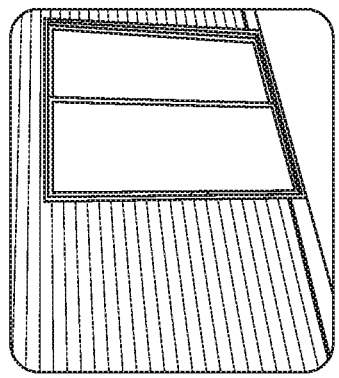
FIG. 4 is a graphic depiction of some door types that can be presented to the user.
Figure 4:
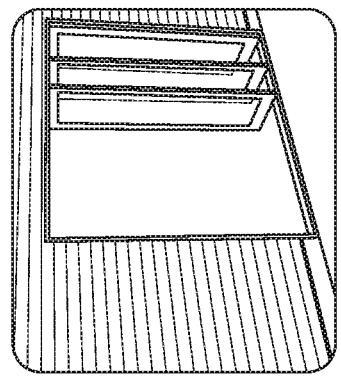
Figure 4:
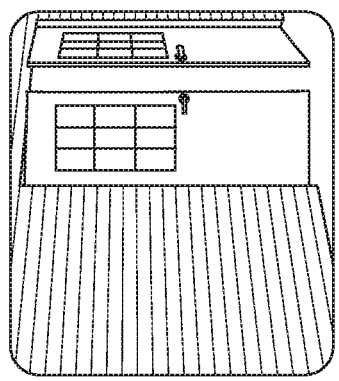
Figure 4:
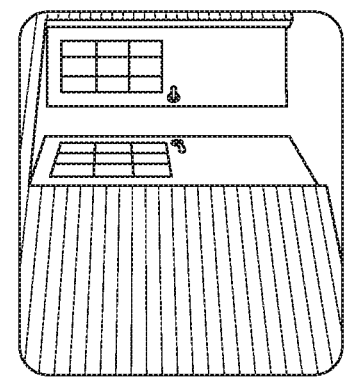
Figure 4:
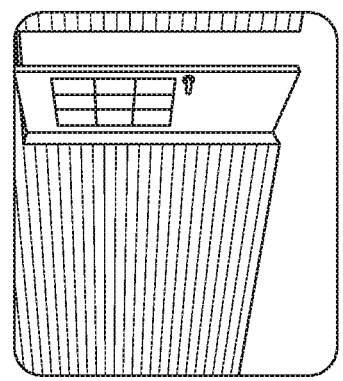
Figure 4:
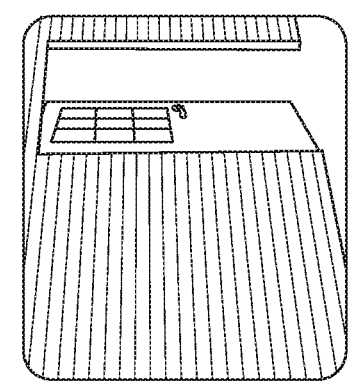
Figure 4:
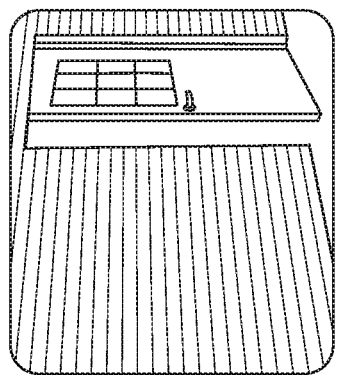
Figure 4:
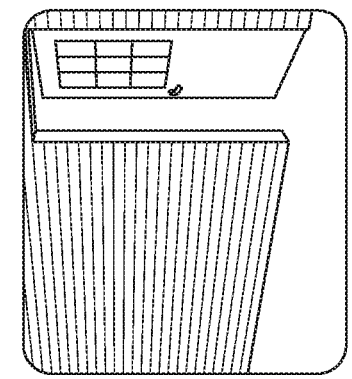

The system (20) of the present disclosure is illustrated by the flow chart of FIG. 1. FIG. 2, in turn, illustrates the digital measuring device (22) in wireless communication with the mobile computing device (24). In accordance with the system, the user utilizes the mobile computing device (24) to generate a depiction of the opening upon which the structure is going to be installed. For example, in the event the structure is to be installed over a window, the user may be presented with a number of different types of windows. FIG. 3 illustrates some common window types, such as fixed windows, louvers, single hung, or double hung. The user will be prompted to select a window that best represents the window in the dwelling. The present invention is not limited to use on window openings. For example, as indicated in FIG. 4, the user may use the system to install a structure over a door way. In this case, the user will be presented with various types of doors, such as sliding doors, folding walls, or inswing/outswing doors.

Figure 5:
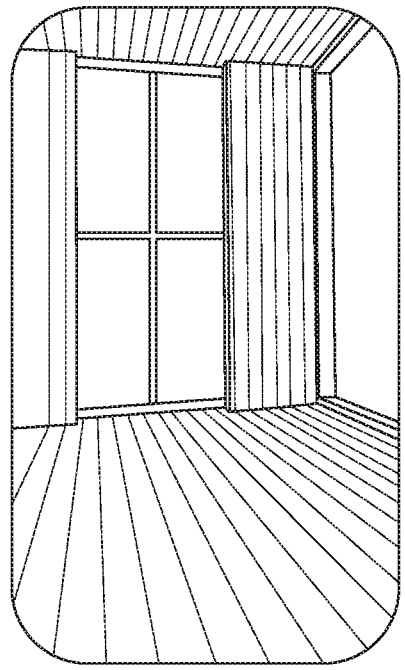
FIG. 5 is a graphic depiction of some common window obstructions that can be presented to the user.
Figure 5:
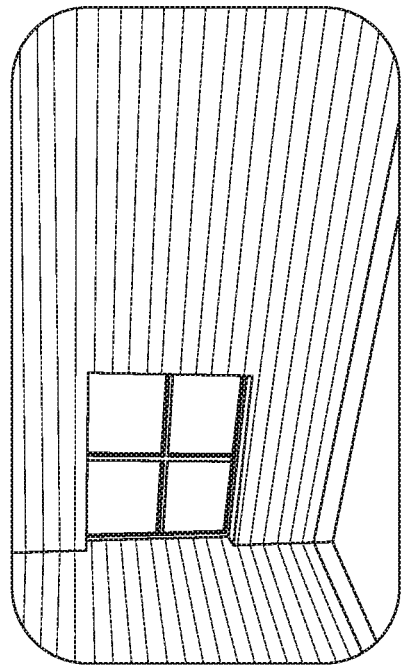
Figure 5:
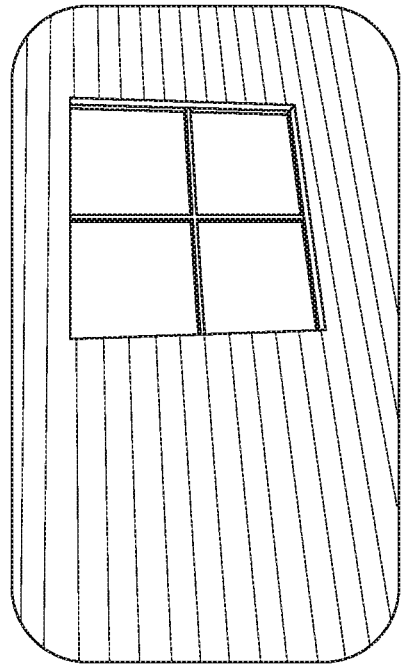
Figure 5:
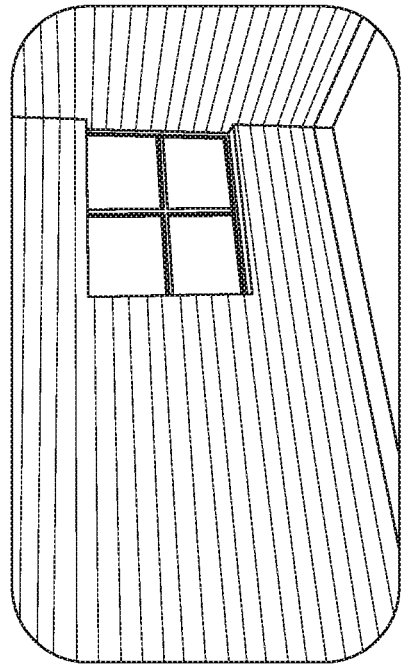
Figure 6:
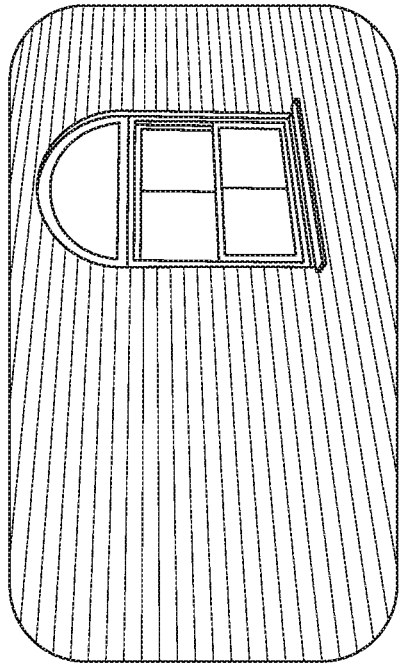
FIG. 6 is a graphic depiction of some common window obstructions that can be presented to the user.
Figure 6:
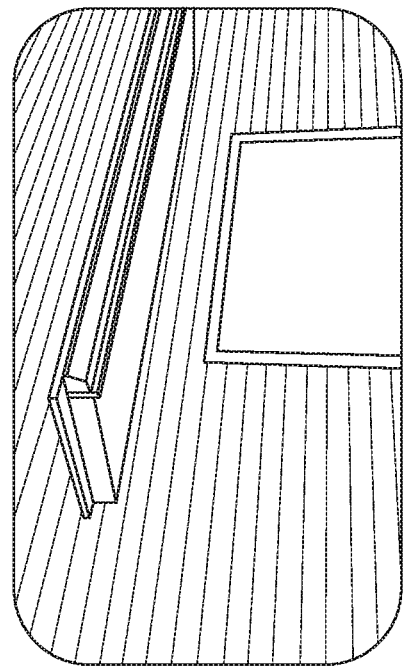
Figure 6:
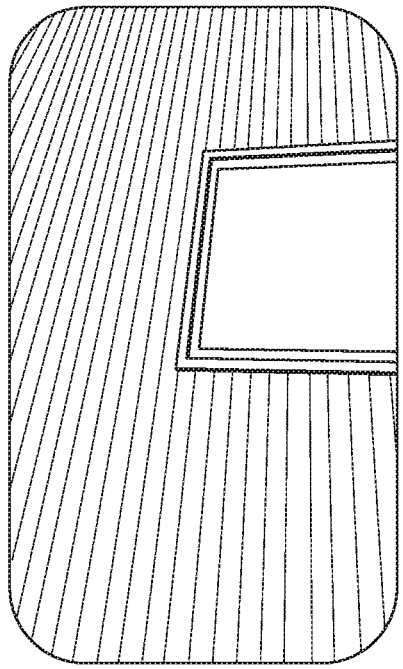
Figure 6:
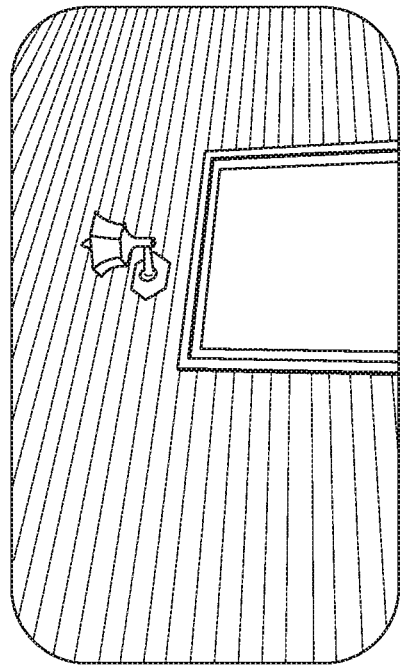
Figure 7:
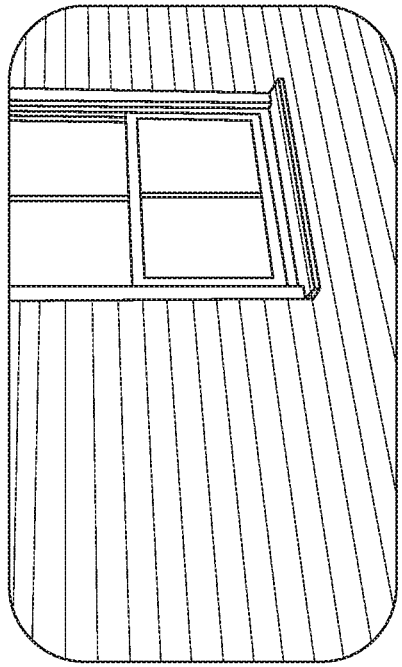
FIG. 7 is a graphic depiction of some common sill types that can be presented to the user.
Figure 7:
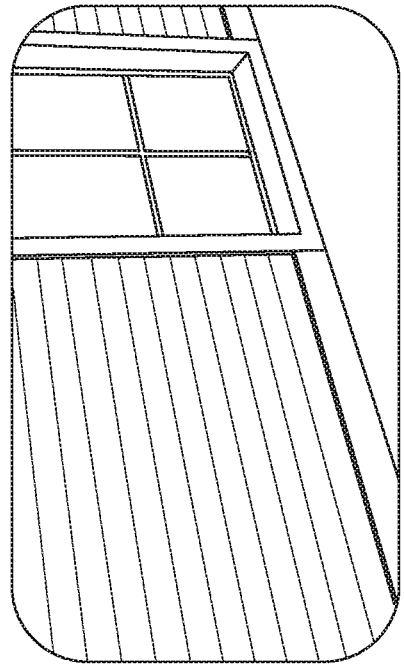
Figure 7:
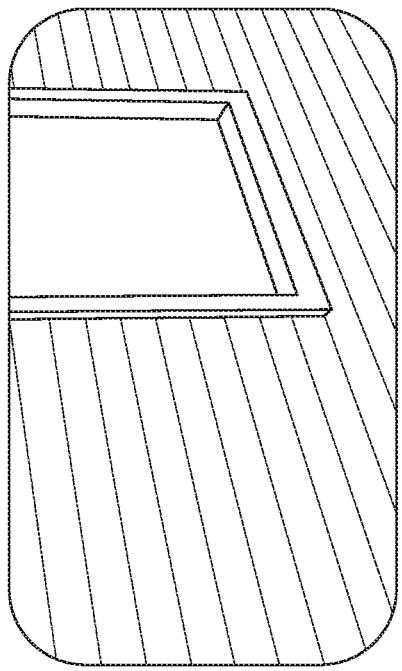
Figure 7:
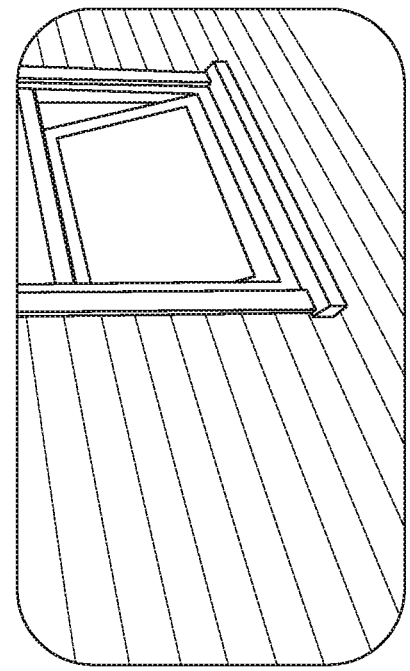

With reference again to a window installation, the user is also prompted to select various types of obstructions that may be present around a window. For example, FIG. 5 is a listing of walls that may limit the installation of a structure over the window. Similarly, FIG. 6 illustrates various types of permanent or movable obstructions that are commonly found in dwellings. After being presented with these options, the user then selects any relevant obstructions, if any, from among the depicted obstructions. Next, as illustrated in FIG. 7, the user is presented with a graphical depiction of various types of window sills. The user then compares the depicted examples with the window present in the dwelling and thereafter selects the relevant sill type from the depicted sills.

Based upon the user's selections, the mobile computing device (24) then generates a graphic representation of the user's window (FIG. 2). The depiction will illustrate the type of window, any adjacent movable or immovable obstructions, as well as the type of window sill. In connection with the system, a database (26) is maintained that associates various types of hurricane shutters with various types of windows. This database is consulted so as to present the user with a list of available shutters. For example, the user will be informed whether accordion, roll, or panel type shutters are available for the depicted window. Again, the list of available shutter types is generated on the basis of the various selections made by the user. The user can thereafter select which type of shutter they are interested in purchasing.

Figure 8:
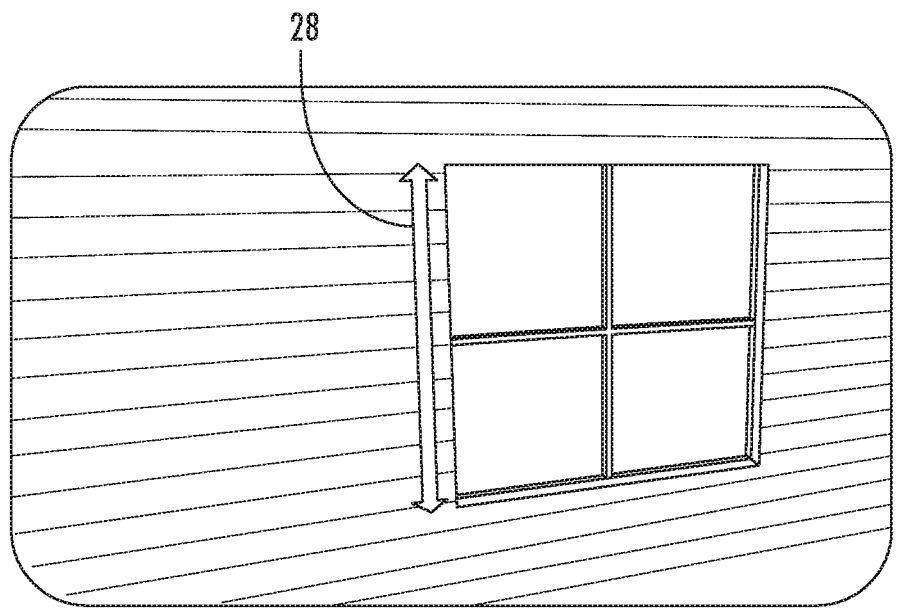
FIG. 8 is a graphic depiction of some of the measurements to be taken by the user.
Figure 9:
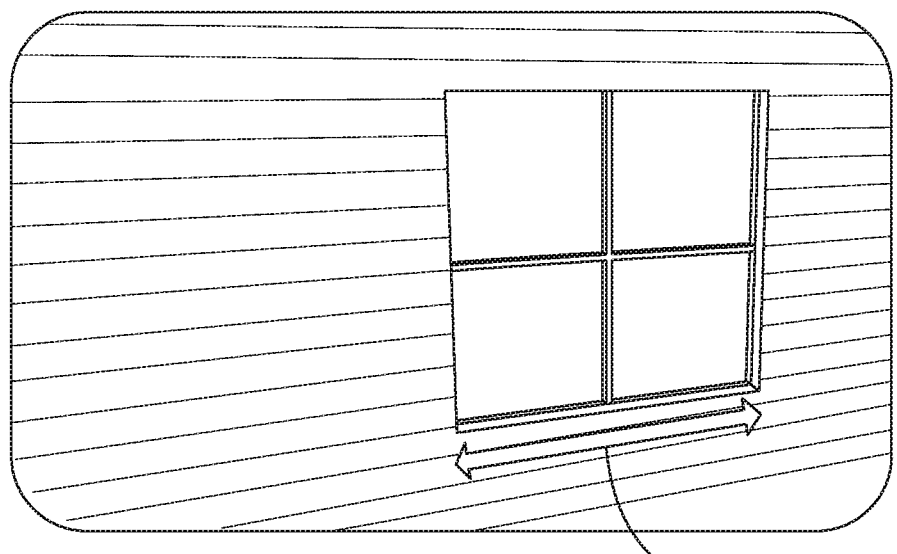
FIG. 9 is a graphic depiction of some of the measurements to be taken by the user.
Figure 10:
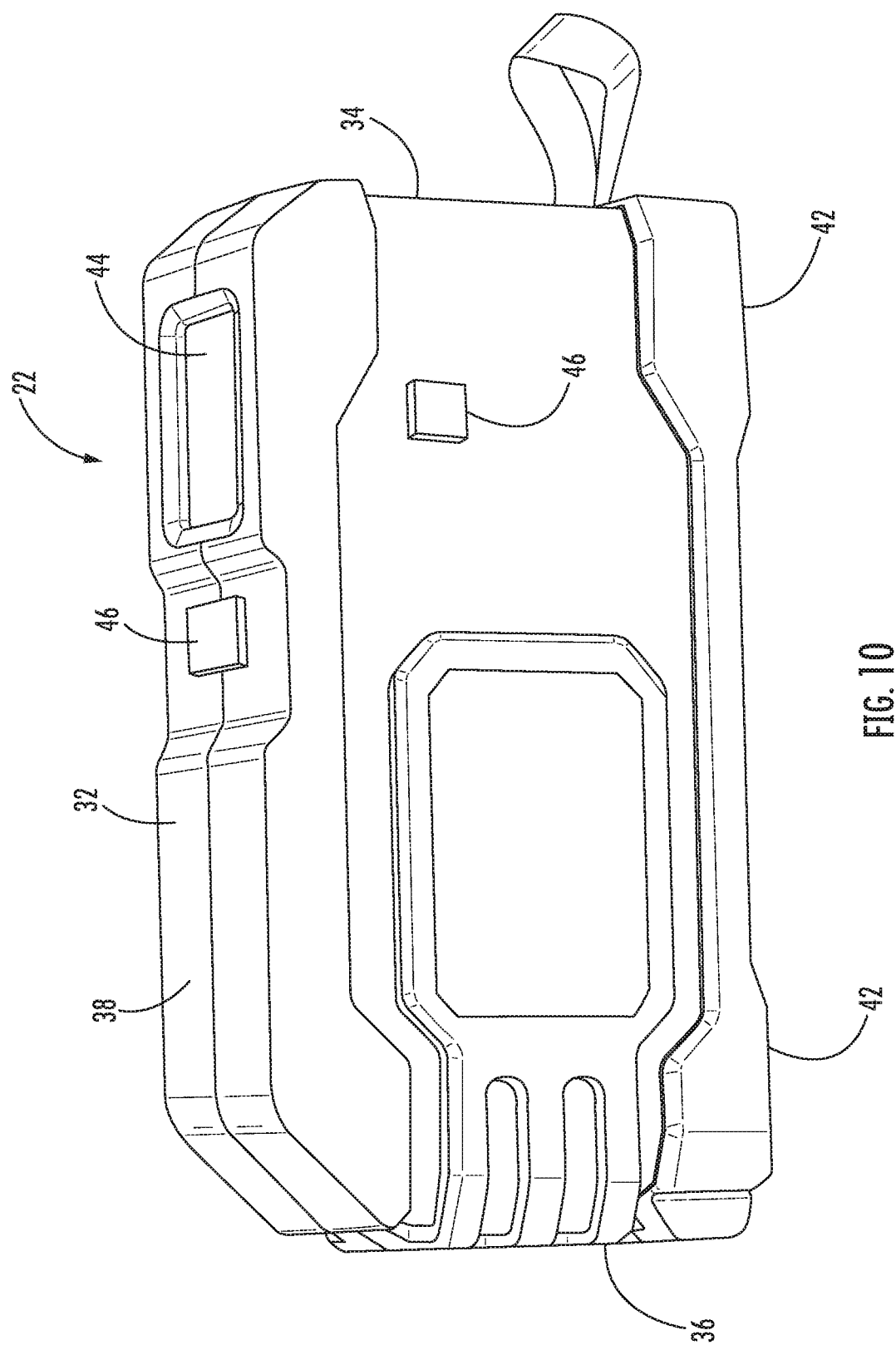
FIG. 10 is a perspective view of the digital measuring device of the present disclosure.

Once the user makes their selection, the database (26) is again accessed (FIG. 1) to determine which measurements must be taken in order for the selected shutter to be installed. More specifically, the mobile computing device (24) generates various graphical depictions of the measurements that must be taken of the depicted window. The graphical depiction may include, for example, arrows (28) showing the various dimensions that must be measured (FIGS. 8-9). Further visual indicators may be provided to differentiate critical from non-critical dimensions. For instance, red arrows may be used to indicate a critical dimension. The depictions will also include indications of whether the desired measurement is an inside or an outside measurement. As used herein, an "outside" measurement is made from an outer peripheral edge of an object, and an "inside" measurement is made from an inner peripheral edge of an object.

The system (20) is preferably employed in conjunction with a digital measuring device (22). The specifics of the digital measuring device (22) are provided hereinafter in connection with FIGS. 10-15. Regardless of the specifics, the digital measuring device (22) is utilized by the user to take the various measurements presented to the user by the mobile computing device (24). The digital measuring device (22) records the measurements taken by the user and determines whether the measurements are inside measurements or outside measurements. As explained below, this is determined in connection with a force sensor (62) associated with the hook (58) at the distal end of the measuring tape (56).

The mobile computing device (24) is in wireless communication with the digital measuring device (22). This allows the mobile computing device (24) to record the measurements taken by the user. It also allows the mobile computing device (24) to alert the user if any of the recorded measurements are inconsistent with the measurements presented to the user.

Alternative Embodiments

Although the system has been described in connection with the sales and installation of hurricane shutters, the system can be employed in installing a variety of different structures associated with a variety of different dwellings. For instance, the system can be employed to install decorative indoor or outdoor shutters as well as any of a variety of window treatments, such as curtains, blinds, and drapes. The system can similarly be used to install shelving or cabinetry. Likewise, the system can be used to install rolling type security closures over doorways. The system is suited for any situation wherein the installation of a structure associated with a dwelling is dependent upon the accuracy and sufficiency of the measurements taken by a user.

Digital Measuring Device

The digital measuring device (22) is next described in connection with FIGS. 10-15. As depicted, device (22) includes a housing (32) with an interior, forward and rearward faces (34, 36), and upper and lower surfaces (38, 42). A digital readout (44) is formed within the upper surface (38) of housing (32) and is preferably sized for easy viewing by the user. Readout (44) can be, for example, an LCD type display. A measurement button (46) is operatively associated housing. In the depicted embodiment, for convenience two measurement buttons (46) are included, one on the top of the housing (32) and the other at the side of the housing (32). These buttons (46) function in recording a measurement once taken by the user. Finally, as illustrated in FIG. 4, the housing includes an opening (48) formed within the forward face (34) to allow the tape measure (56) to be dispensed.

Figure 11:
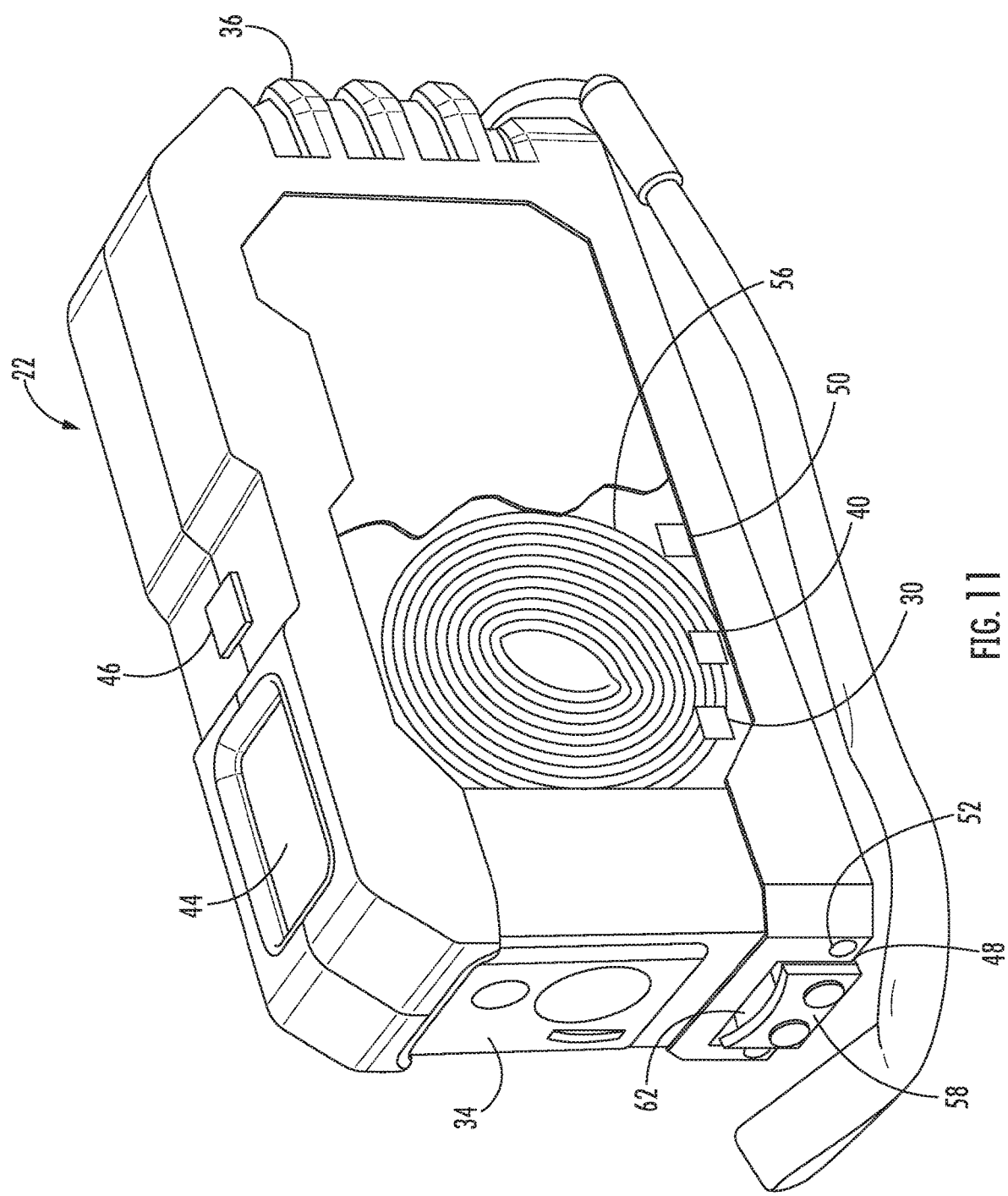
FIG. 11 is a partial sectional view of the digital measuring device of the present disclosure.
Figure 12:
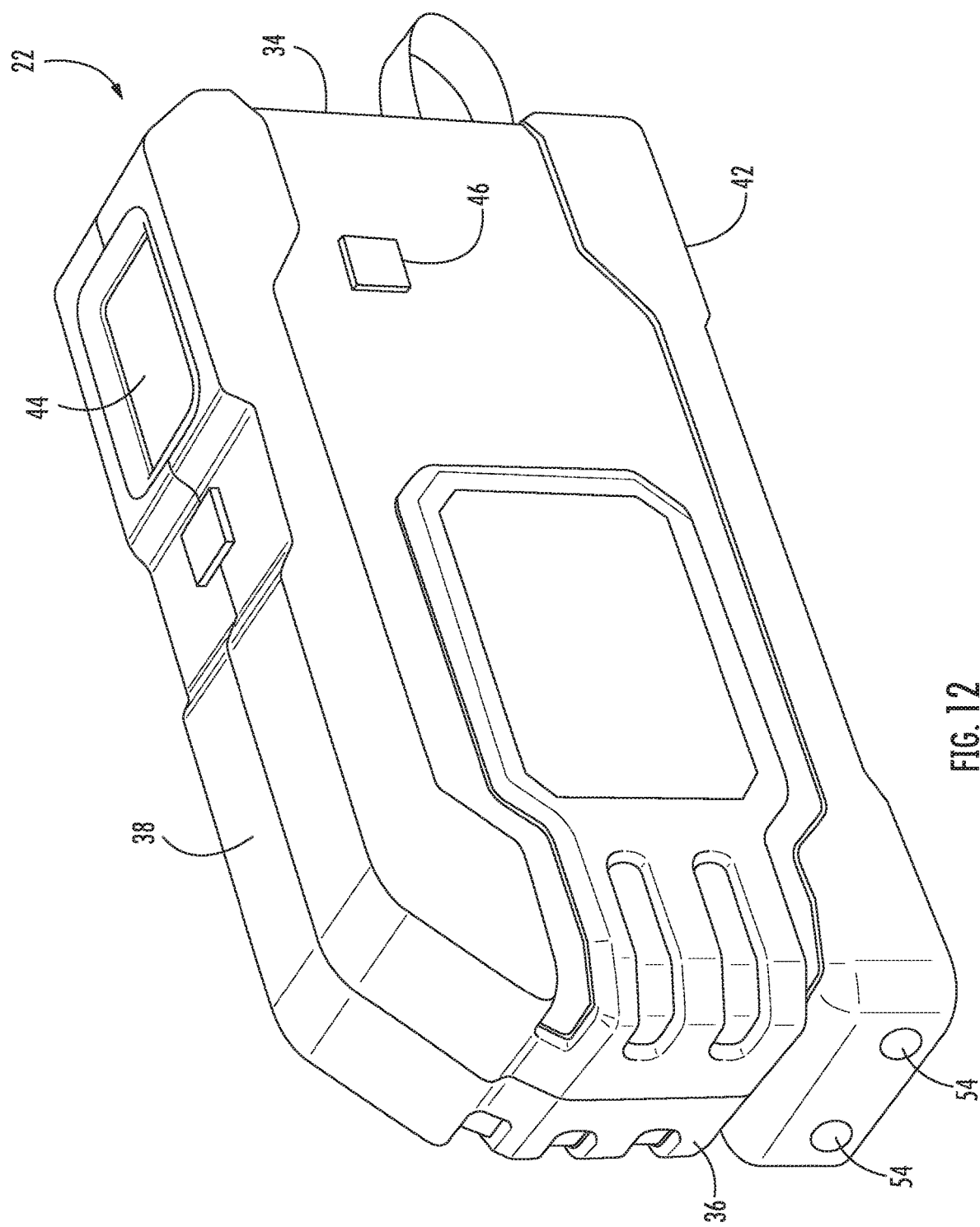
FIG. 12 is a perspective view of the digital measuring device of the present disclosure.
Figure 13:
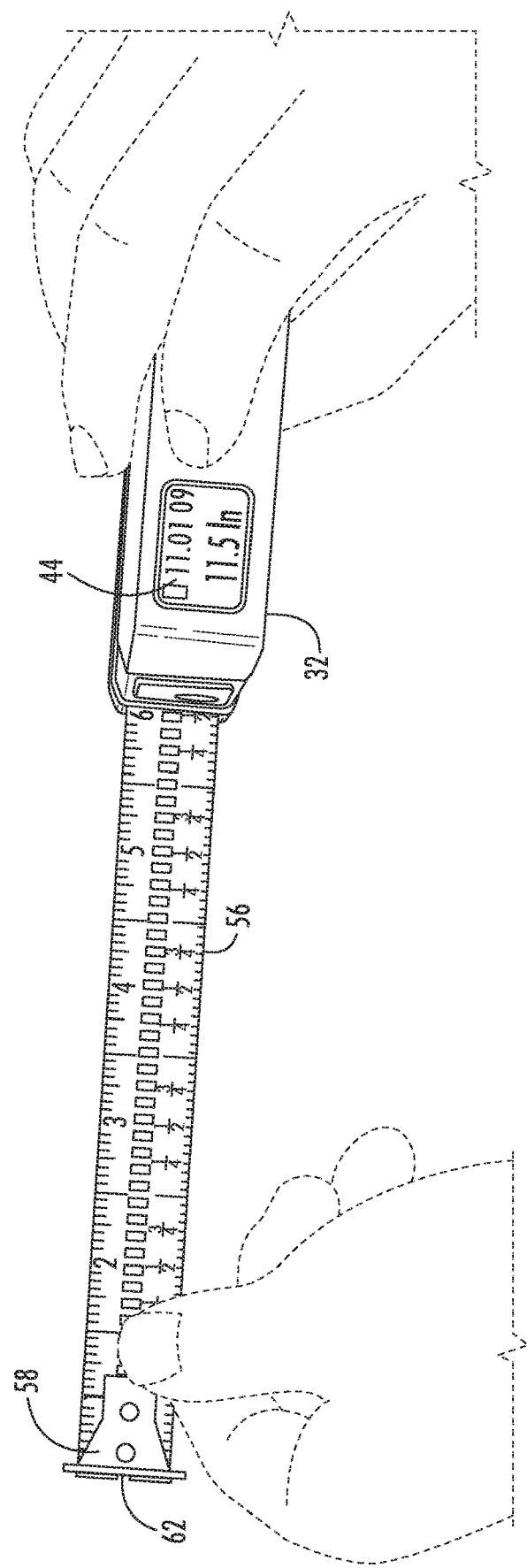
FIG. 13 is a top plan view of the digital measuring device of the present disclosure.
Figure 14:
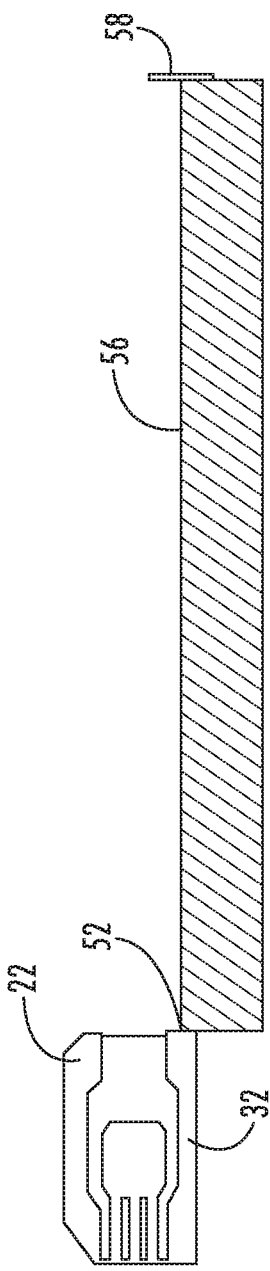
FIG. 14 is a side elevational view of the digital measuring device taking an outside measurement.
Figure 15:
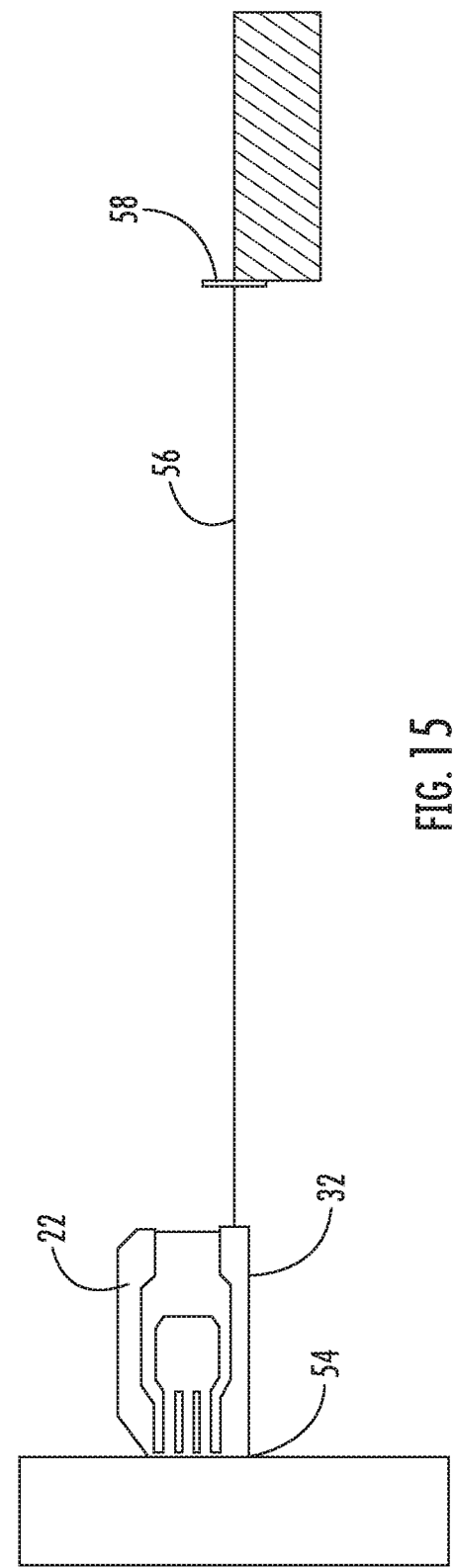
FIG. 15 is a side elevational view of the digital measuring device taking an inside measurement.

One feature of the measuring device (22) is the ability to automatically determine whether a given measurement should be taken from the front (34) or the back (36) of the housing (32). This is accomplished via two sets of optical sensors. Specifically, as indicated in FIGS. 11 and 12, a front facing optical sensor (52) is formed within the forward face (34) of the housing (32), and a rear facing optical sensor (54) is formed within the rearward face (36) of the housing (32). In use, the front facing optical sensor (52) is adapted to detect any obstructions positioned adjacent the forward face (34) of the housing, and the rear facing optical sensor (54) is adapted to detect any obstructions positioned adjacent the rearward face (36) of the housing. These sensors operate in connection with an internal microprocessor (40) to determine if the measurement being taken should originate at the front or the back (34 or 36) of the housing (32). This is depicted in FIGS. 14 and 15. Namely, FIG. 14 illustrate the housing (32) being positioned with the front face (34) abutting the object being measured. In this case, the front facing optical sensors (52) would be obstructed and the microprocessor would then compute the measurement from the front (34) of the housing (32). In other words, the measured length would be equal to the length of the dispensed measuring tape (56). Alternatively, as noted in FIG. 15, if the rear facing optical sensors (54) are obstructed, the measurement is taken from the back (36) of the housing (32). In other words, the measured length would be equal to the length of dispensed measuring tape (56) in addition to the length of the housing (32).

The measuring tape (56) is preferably positioned within the interior of the housing (32) and is adapted to be extended through the forward opening (48). Tape (56) can be, for example, dispensed from a wound coil within the interior of housing (32). In the preferred embodiment, tape (56) is approximately 30 mm wide to give it a sufficient amount of "standout" to measure doors and windows. Also, the tape ideally includes ½", ¼" and ¹⁄₁₆" gradations. The microprocessor is also designed to detect the length of tape (56) extended from housing (32). This is accomplished via an encoder (50) positioned within interior of housing (32). Those of ordinary skill will readily appreciate still yet other methods of determining the exposed length of tape (56). As noted above, the length of the housing (32) may be added to the exposed length of tape (56) to arrive at a final measurement in the event the rear facing sensors (54) are obstructed.

As best illustrated in FIG. 2, a hook (58) is formed at the distal end of the tape measure (56). As is typical of most tape measures, this hook (58) is provided to allow the tape to be secured over the edge of a feature being measure. The present hook (58) differs from conventional hooks in that it includes a force sensor (62). The force sensor (62) is ideally located beneath the hook (58) and is adapted to detect whether hook (58) is under compression or tension. In other words, sensor (62) will detect whether hook (58) is being pushed or pulled. The force sensor (62) communicates with the microprocessor and associates compressive forces with an inside measurement and tensile forces with an outside measurement being taken. In other words, if the hook (58) is positioned over the edge of a feature being measured (i.e. an outside measurement), this will be detected by the hook (58) as a tensile force and communicated to the microprocessor. Alternatively, if the hook (58) is abutting a surface being measured (i.e., an inside measurement), this will be detected by the hook (58) as a compressive force and communicated to the microprocessor.

The microprocessor is also in communication with the encoder and the front facing and rear facing optical sensors (52 and 54). As such, the microprocessor can compute a measured length, with the measured length being computed from the back (36) of housing (32) when the rear facing optical sensor (54) detects an obstruction and being computed from the front (34) of the housing (32) when the front facing optical sensor (52) detects an obstruction. In either case, the measured length is displayed on the digital readout (44) of the housing (32). The digital measuring device (22) further includes a wireless communications module (30) that is operatively associated with the digital measuring tape (22) and wirelessly transmits the measured length upon depressing the measurement button (46). The communications module transmits the measurements to a mobile computing device (24). As explained above, the mobile computing device (24) can detect whether the measurements as taken by the user conform to those specified to be taken by the system (20).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A digital measuring system for assisting a user in taking measurements, the digital measuring system comprising:
    a digital measuring tape comprising a housing with an interior, the housing including forward and rearward faces, upper and lower surfaces, a digital readout formed within the upper surface, a measurement button operatively associated housing, an opening formed within the forward face;
    a front facing optical sensor formed within the forward face of the housing, the front facing optical sensor adapted to detect an obstruction positioned adjacent the forward face of the housing;
    a rear facing optical sensor formed within the rearward face of the housing, the rear facing optical sensor adapted to detect an obstruction positioned adjacent the rearward face of the housing;
    a measuring tape positioned within the interior of the housing housing, the tape adapted to be extended through the opening in the forward face of the housing, an encoder positioned within interior of the housing and adapted to detect the length of the tape extended from the housing;
    a hook formed at the distal end of the tape measure, a force sensor associated with the hook and adapted to detect whether the hook is under compression or tension, with compression being associated with an inside measurement being taken and tension being associated with outside measurement being taken;

a microprocessor in communication with the encoder and the front facing and rear facing optical sensors, the microprocessor computing a measured length, with the measured length being computed from the back of the housing when the rear facing optical sensor detects and obstruction and being computed from the front of the housing when the front facing optical sensor detects and obstruction, the measured length being displayed on the digital readout;

a wireless communications module operatively associated with the digital measuring tape and wirelessly transmitting the measured length upon depressing the measurement button;

a mobile computing device wirelessly communication with the communications module of the digital measuring tape and adapted to receive the measured length.

2. An automated method for assisting a user in installing a structure over the opening of a building, the method comprising:

presenting the user with a graphical depiction of various opening types, the user selecting a relevant opening type from among the depicted openings;

presenting the user with a graphical depiction of various types of obstructions that may be associated with the opening, the user selecting the relevant obstruction, if any, from the depicted obstructions;

generating a graphical depiction of the opening based upon the various selections may by the user;

presenting the user with a list of available structures for the depicted opening, the list of available structures being generated on the basis of the various selections made by the user, the user selecting the desired structure from the list of available structures;

presenting the user with graphical depictions of the various measurements that must be taken of the depicted opening in order for the selected structure to be properly installed, the graphical depictions including arrows showing where the measurements need to be taken.

3. The automated method as described in claim 2 wherein the graphical depictions of the measurements include depictions of whether the measurements are inside or outside measurements.

4. The automated method as described in claim 2 wherein the user is provided with a digital measuring device for taking the various measurements presented to the user.

5. The automated method as described in claim 4 wherein the digital measuring device also records whether the measurements are inside measurements or outside measurements.

6. The automated method as described in claim 2 wherein the user is provided with a mobile computing device, the mobile computing device in wireless communication with the digital measuring device, the mobile computing device recording the measurements taken by the user and alerting the user if any of the recorded measurements are inconsistent with the measurements presented to the user.

7. The automated method as described in claim 2 wherein the opening is a door.

8. The automated method as described in claim 2 wherein the opening is a window.

9. The automated method as described in claim 2 wherein the structure is a shutter.

10. The automated method as described in claim 2 wherein the structure is a hurricane shutter.

11. An automated method for assisting a user in installing shutters upon a window, the method comprising:

presenting the user with a graphical depiction of various window types, the user selecting a relevant window type from among the depicted windows;

presenting the user with a graphical depiction of various types of obstructions that may be associated with the window, the user selecting the relevant obstruction, if any, from the depicted obstructions;

presenting the user with a graphical depiction of various types of window sills, the user selecting the relevant sill type from the depicted sills;

generating a graphical depiction of the window based upon the various selections may by the user;

presenting the user with a list of available shutters for the depicted window, the list of available shutter types being generated on the basis of the various selections made by the user, the user selecting the desired shutter type from the list of available shutter types;

presenting the user with graphical depictions of the various measurements that must be taken of the depicted window in order for the selected shutter to be properly installed, the graphical depictions including arrows showing where the measurements need to be taken and whether the measurements are inside or outside measurements;

providing the user with a digital measuring device for taking the various measurements presented to the user, the digital measuring device recording the measurements taken by the user and whether the measurements are inside measurements or outside measurements;

providing the user with a mobile computing device, the mobile computing device in wireless communication with the digital measuring device, the mobile computing device recording the measurements taken by the user and alerting the user if any of the recorded measurements are inconsistent with the measurements presented to the user.

* * * * *